Oct. 10, 1967     D. W. ROLLINS     3,346,224
COLLAPSIBLE HITCH
Filed Dec. 9, 1965     5 Sheets-Sheet 2
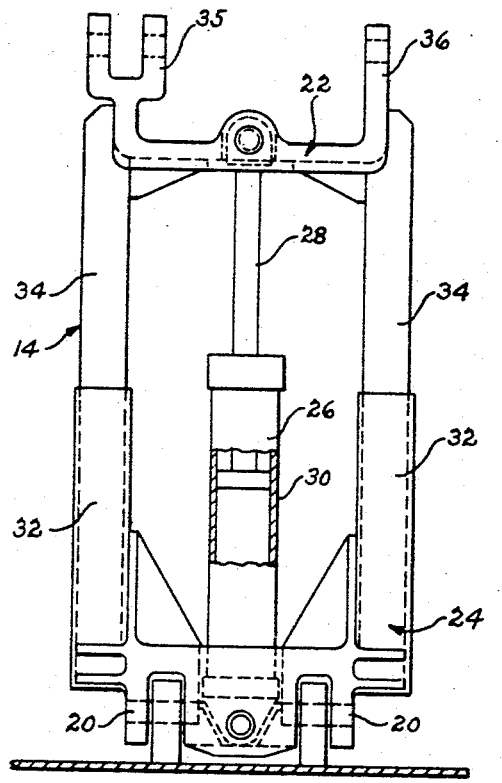
FIG. 4.
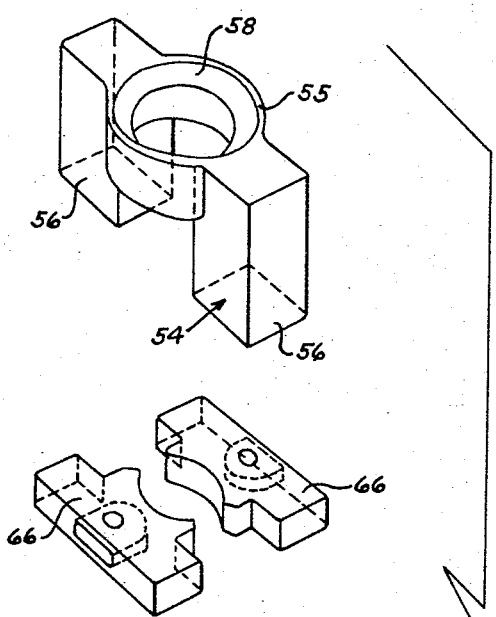
FIG. 10.
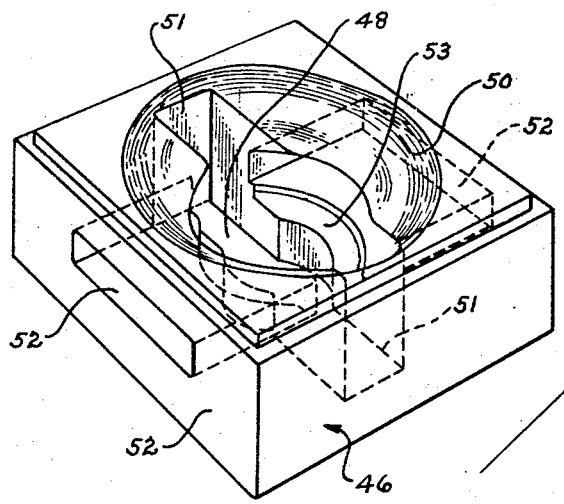

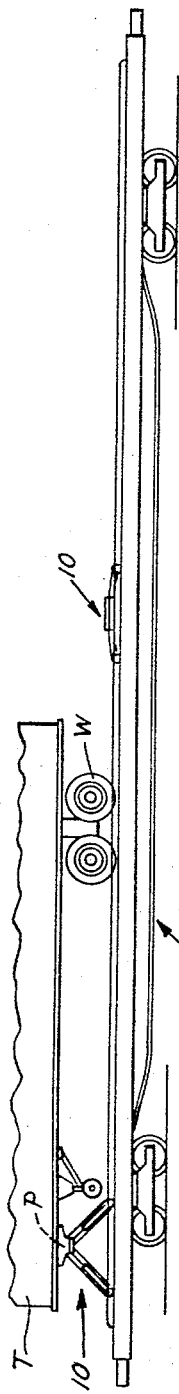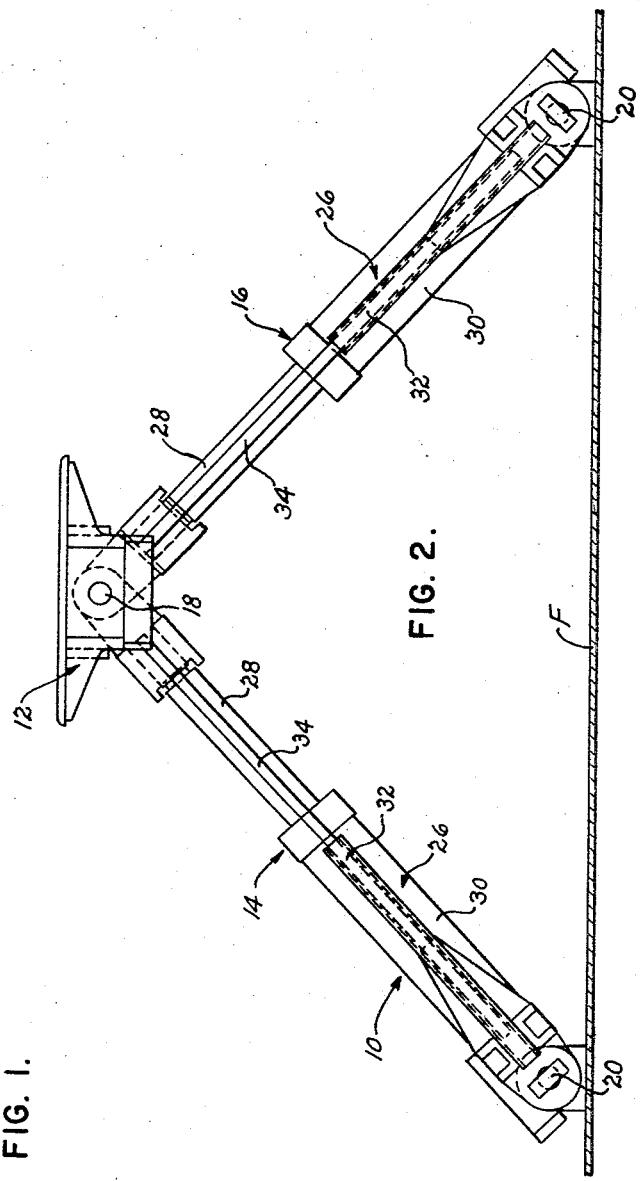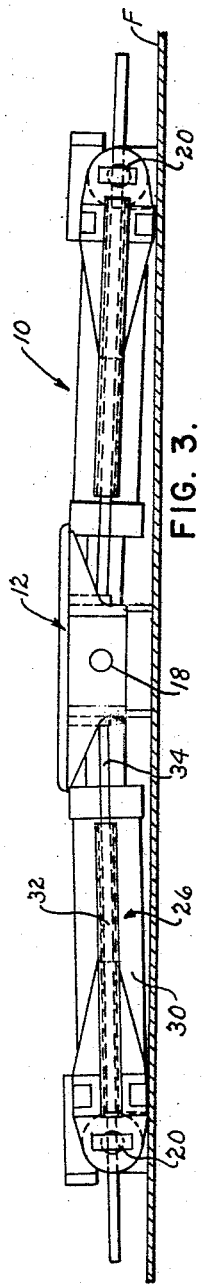

United States Patent Office 3,346,224
Patented Oct. 10, 1967

3,346,224
COLLAPSIBLE HITCH
Dallas W. Rollins, St. Charles, Mo., assignor to ACF Industries, Incorporated, New York, N.Y., a corporation of New Jersey
Filed Dec. 9, 1965, Ser. No. 512,643
9 Claims. (Cl. 248—119)

ABSTRACT OF THE DISCLOSURE

A mounting or support plate structure for a collapsible hitch and having a central opening therein defined by frusto-conical guide surfaces for guiding a kingpin of a trailer. A depressible sleeve is mounted within the central opening and snaps about the kingpin after the kingpin is accurately seated within the central opening. The mounting plate structure is movable in a vertical direction from the collapsed position of the hitch to receive and secure the superjacent kingpin.

*Background and description of the invention*

Heretofore, it has been common to provide a collapsible hitch with a mounting plate having jaws to lock the kingpin of a trailer. The jaws have been locked automatically about the kingpin by a relative horizontal movement between the kingpin and the jaws. In some instances this has been accomplished by a rearward movement of the trailer with the kingpin engaging the jaws to pivot the jaws about the kingpin in a locked position. In other instances the fifth wheel or support plate has been moved in a generally horizontal direction with the jaws contacting and automatically locking the kingpin to the hitch. When the support plate is moved relative to the kingpin a relatively accurate spotting of the trailer is required.

The present invention is directed to a mounting plate structure for a collapsible hitch which automatically locks the kingpin of a trailer or the like upon relative vertical movement between the hitch and the trailer without any manual operation of the mounting plate structure being required. The hitch comprises a generally vertically movable support plate having a central opening therein defined by frusto-conical surfaces to receive and guide the kingpin to a centered position for locking.

It is highly desirable that horizontal loads applied to the kingpin induce a shear stress rather than bending stresses in the kingpin. To accomplish this, the force is applied as near to the juncture of the kingpin and trailer center plate as possible. The present invention includes a force transmitting member fitting within the central opening of the support plate adapted to receive the kingpin and to fit about the kingpin closely adjacent the lower surface of the trailer thereby to apply horizontal loads to the kingpin which will induce primarily shear stresses. The force transmitting member is depressed when contacted vertically by the kingpin to permit guiding the kingpin to a centered position along the frusto-conical surfaces of the support plate. Once the kingpin is centered the force transmitting member snaps upwardly from its depressed position about the kingpin and permits locking of the kingpin.

It is an object of this invention to provide a hitch having a supporting plate structure movable in a generally vertical direction and automatically latching the kingpin of a trailer or the like without any manual operations being required.

Another object of this invention is the provision of such a hitch in which loads or impact forces are applied to the kingpin closely adjacent the lower surface of the trailer so that such loads will induce primarily a shearing stress in the kingpin instead of a bending stress.

A further object of this invention is the provision of such a hitch in which the kingpin may be easily centered for seating within the supporting plate structure without an accurate spotting of the trailer.

The invention accordingly comprises the constructions hereinafter described, the scope of the invention being indicated in the following claims.

In the accompanying drawings in which one of various possible embodiments of the invention is illustrated;

FIGURE 1 is a side elevation of a railway flat car illustrating the hitch comprising the present invention, one hitch being shown on the flat car erected and secured to the kingpin of a trailer and another hitch being shown in a collapsed position on the flat car;

FIGURE 2 is an enlarged side elevation of the hitch shown in FIGURE 1 in erect position;

FIGURE 3 is a side elevation of the hitch shown in FIGURE 2 in a collapsed position on the deck of a railway flat car;

FIGURE 4 is a plan view of an extensible leg forming the support for the hitch shown in FIGURES 2 and 3;

FIGURE 10 is an exploded perspective view of the centering and latching means for securing the kingpin of a trailer or the like shown removed from the supporting plate structure;

Corresponding reference characters indicate corresponding parts throughout the several views of the drawings.

Figure 5:
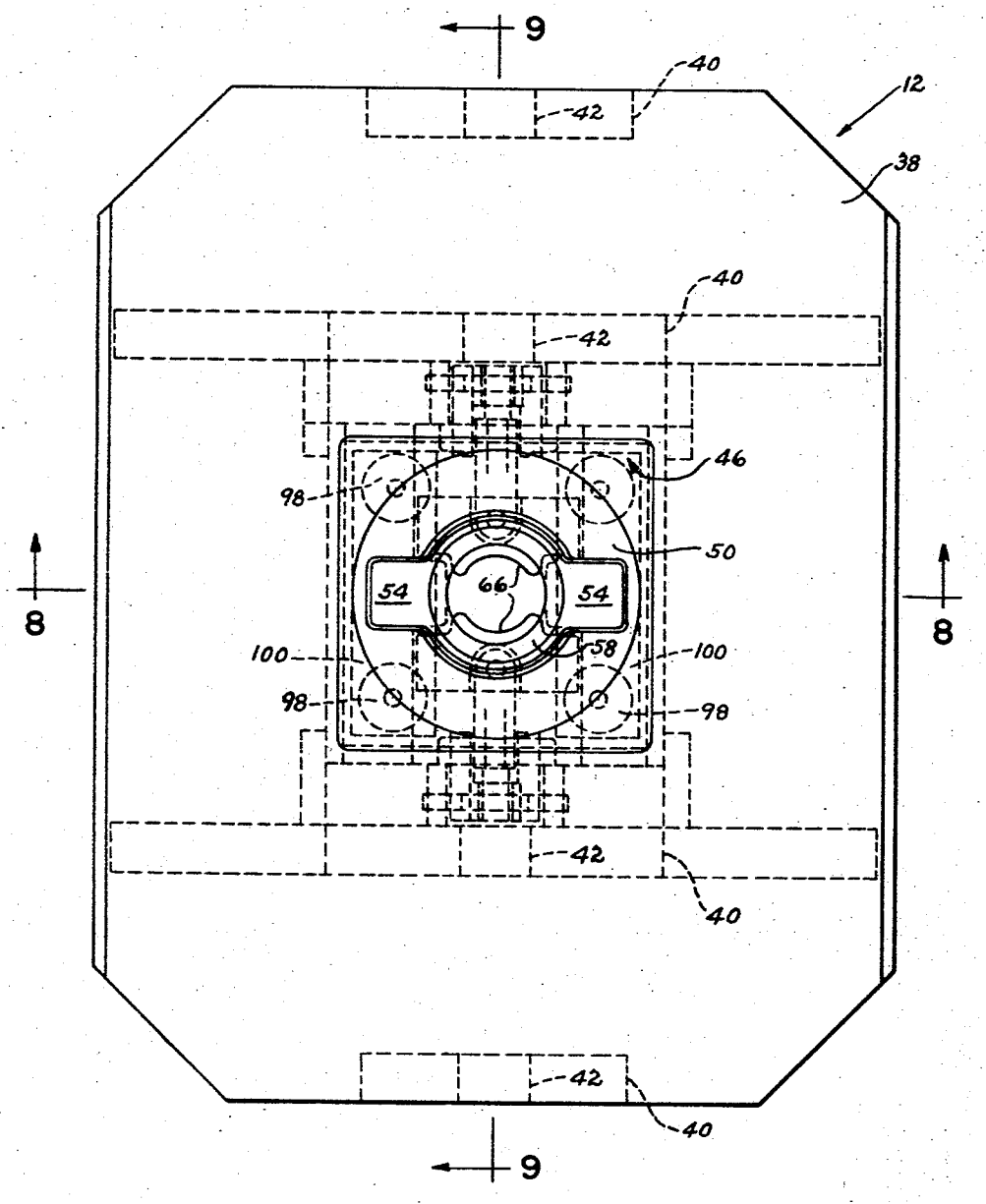
FIGURE 5 is a top plan of the supporting plate structure of the hitch shown in FIGURES 2–4.
Figure 6:
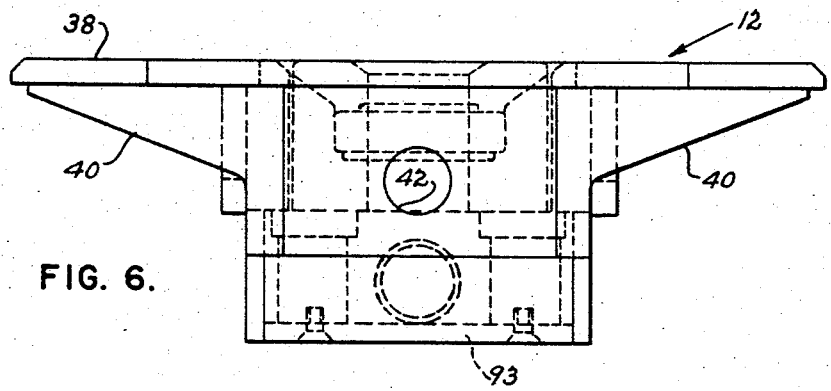
FIGURE 6 is a side elevation of the supporting plate structure shown in FIGURE 5.

Referring now to the drawings for a better understanding of this invention and more particularly to FIGURE 1, a railway flat car F has a trailer T thereon with roadway wheels W adjacent one end and a kingpin P adjacent the other end. The hitch comprising the present invention is generally indicated by the numeral 10 and engages kingpin P to secure the trailer. Flat car F is adapted to carry two trailers and illustrates one hitch 10 in a collapsed position intermediate the length of flat car F.

Hitch 10 comprises a fifth wheel mounting or supporting plate structure indicated generally at 12 as shown in FIGURES 2 and 3. To support plate structure 12 extensible legs 14 and 16 are pivotally connected adjacent their upper ends to plate structure 12 about pivot 18. The lower ends of legs 14 and 16 are mounted about pivots 20 to the deck or floor of railway car F. Legs 14 and 16 are substantially identical and for purposes of illustration only leg 14 is shown in detail. As shown in FIGURE 4, leg 14 comprises a lower base portion 24 and an upper yoke portion 22 adapted to be extended and retracted relative to the base portion. Hydraulic fluid pressure means 26 moves yoke portion 22 relative to base portion 24 and comprises a piston rod 28 secured to yoke portion 22 and a cylinder 30 forming a part of base 24.

Figure 11:
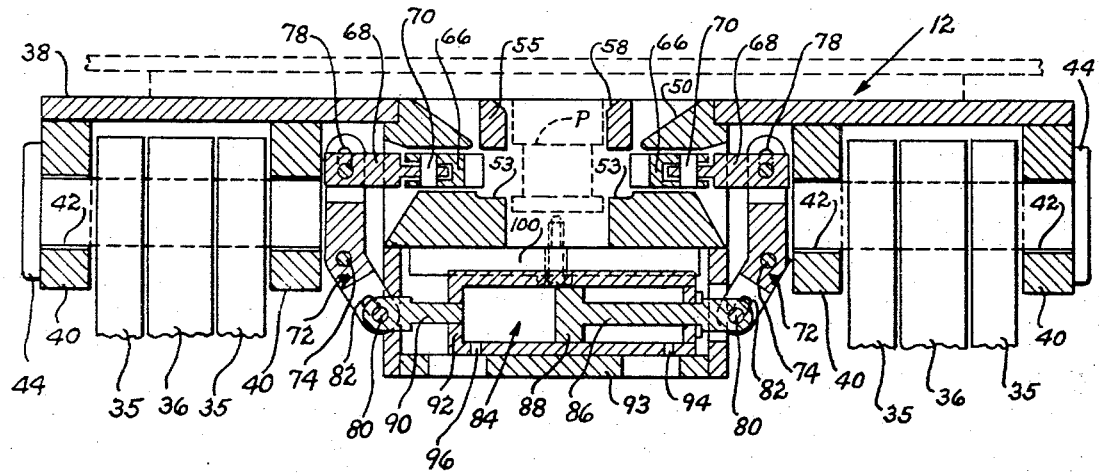
FIGURE 11 is a sectional view similar to FIGURE 9 but showing the jaws for locking the kingpin of a trailer in an open position.

To aid in supporting plate structure 12 and to guide yoke portion 22, base portion 24 includes a pair of lower spaced tubular members 32 of a generally rectangular hollow cross section receiving upper telescoping members 34 of yoke portion 22 having a solid rectangular section. Arms 35 and 36 are pivotally connected to supporting plate structure 12 about pivot 18 as shown in FIGURE 11. It is to be understood that arm 36 on one leg fits between the bifurcated arm 35 on the other leg.

A suitable hydraulic control panel (not shown) may be provided on flat car F to control the actuation of cylinders 26. Thus, to raise hitch 10 from the position shown in FIGURE 3 fluid is supplied to cylinders 30 to extend piston rods 28 thereby raising support plate structure 12 in a generally vertical direction. When hitch 10 is collapsed from the position of FIGURE 2, fluid is removed from cylinders 30 and supporting plate structure 12 moves downwardly in a generally vertical direction.

Supporting plate structure 12 is shown in FIGURES 5–12 and comprises an upper support plate 38 having downwardly extending ribs 40 with openings 42 therein to receive pins 44 forming pivot 18. Support plate 38 includes a central integral block 46 as shown in FIGURE 10 having a central opening 48 extending vertically therethrough. A frusto-conical surface 50 defines opening 48 and provides an inclined surface along which kingpin P may easily slide to a centered position. End slots 51 adjacent opposite sides of central opening 48 communicate with opening 48 and extend vertically through block 46. Slots 52 extend laterally through block 46 and at right angles to end slots 51 and communicate with opening 48. A ledge or flat 53 is arranged adjacent each slot 52 and extends inwardly of central opening 48 as shown in FIGURES 10 and 11.

Mounted within central opening 48 is a kingpin locator generally designated 54 which acts as a force transmitting member to transmit forces between kingpin P and supporting plate structure 12 at a position closely adjacent the juncture of kingpin P with the trailer center plate thereby minimizing the bending stresses in kingpin P.

Force transmitting member 54 includes a central sleeve 55 and a pair of legs 56 extending downwardly from sleeve 55 on opposite sides thereof. An upper annular rim 58 of sleeve 55 is of a frusto-conical shape and is inclined at the same angle as the frusto-conical surface 50 of block 46. End slots 51 of block 46 receive legs 56. Ledges 53 provide a stop for sleeves 54 as will be fully explained hereafter.

Mounted within slots 52 are oppositely facing jaws 66 adapted to engage and latch kingpin P. To actuate jaws 66 and referring specifically to FIGURES 9 and 11, an arm 68 is pivotally connected at 70 to each jaw 66. A link generally designated 72 for each jaw 66 is pivotally supported at 74 and has an upper portion pivotally connected at 76 to arm 68 through an elongate slot 78. A lower portion of link 72 is pivotally connected at 80 through an elongate slot 82 to hydraulic fluid pressure means indicated generally by numeral 84. Fluid pressure means 84 comprises a double acting cylinder including a piston rod 86 secured to one link 72 and connected to a piston 88. Extending from the opposite end of hydraulic pressure means 84 is a rod 90 secured to an end of the cylinder body 92 and movable with the cylinder body. Rod 90 is secured to the other opposite link 72 about pivot 80. A lower support plate 93 for fluid pressure means 84 is mounted on supporting plate structure 12.

Figure 9:
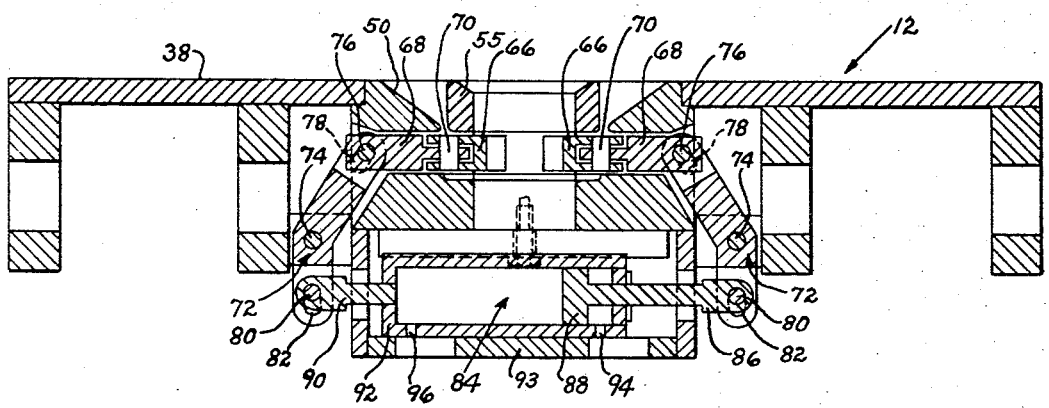
FIGURE 9 is a section taken generally along line 9—9 of FIGURE 5.

To actuate jaws 66 and move jaws 66 from the closed position shown in FIGURE 9 to the open position shown in FIGURE 11, fluid is supplied through port 94 shown in FIGURE 9 to move piston 88 to the left viewing FIGURE 9 and piston body 92 to the right viewing FIGURE 9. Thus, piston rod 86 and rod 90 are moved toward each other to move jaws 66 away from each other to release kingpin P. In like manner, for closing jaws 66 from the position of FIGURE 11 fluid is supplied to port 96 to move piston 88 to the right as viewed in FIGURE 11 and cylinder body 92 to the left as viewed in FIGURE 11 thereby to move jaws 66 toward each other for locking kingpin P. Fluid pressure means 84 may be suitably controlled by a control panel (not shown) employed to control the actuation of legs 14 and 16 for raising and lowering the hitch.

Figure 8:
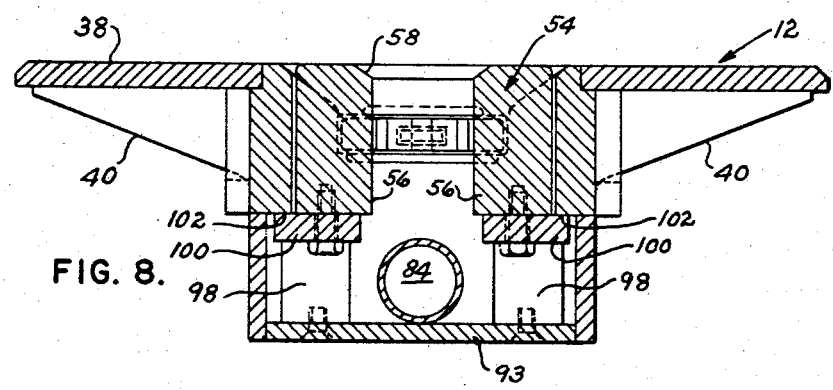
FIGURE 8 is a section taken generally along line 8—8 of FIGURE 5.
Figure 12:
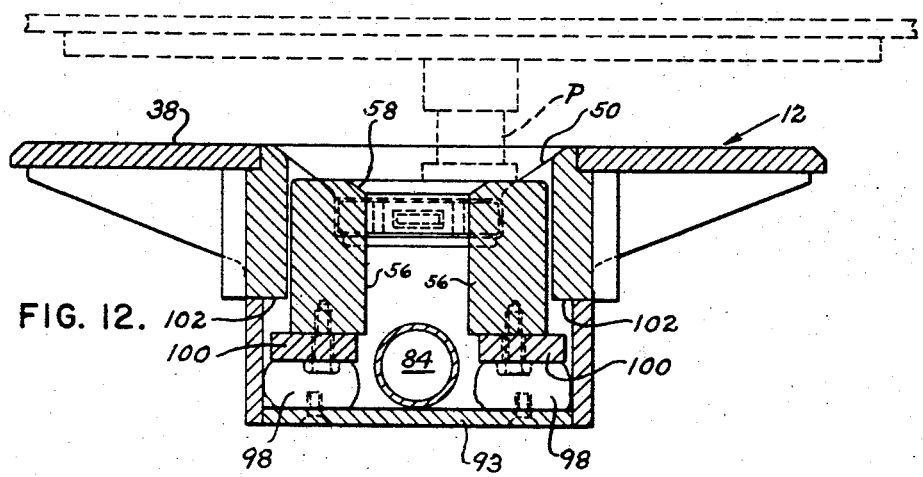
FIGURE 12 is a sectional view similar to FIGURE 8 and illustrates an uncentered kingpin being guided to centered position with the kingpin engaging and depressing the kingpin force transmitting member.
Figure 7:
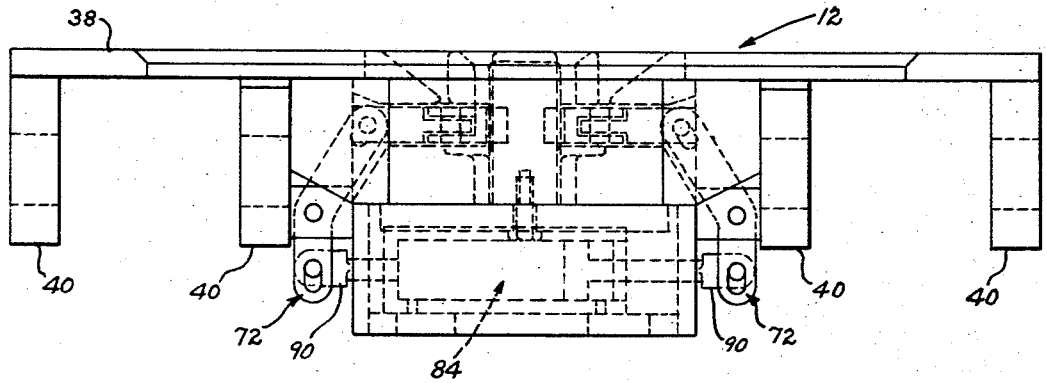
FIGURE 7 is an end elevation of the supporting plate structure shown in FIGURE 5.

Force transmitting member 54 transmits forces to kingpin P and is mounted for limited vertical movement in order to be depressed when contacted vertically by a kingpin P. To bias the force transmitting member 54 upwardly continuously, a resilient pad 98 is mounted between a lower plate 93 of supporting plate structure 12 and each leg 56. Pad 98 may be rubber of a relatively low hardness thereby permitting member 54 to be easily depressible. A bar 100 is secured between each leg 56 and its associated pads 98. Bar 100 abuts the lower surface 102 of block 46 when force transmitting member 54 is in its upper normal position as shown in FIGURE 8. To limit the downward movement of force transmitting member 54, collar 55 engages ledges 53. In this position, force transmitting member 54 is fully depressed and frusto-conical surface 58 of member 54 forms a continuation of the frusto-conical surface 50 on block 46 so that a smooth and even inclined surface is provided to guide kingpin P into centered position. When kingpin P is properly centered relative to the central aperture formed by sleeve 55, force transmitting member 54 snaps upwardly under the bias of pads 98 to the position shown in FIGURES 8 and 9.

Jaws 66 fit beneath collar 55 in the locked position of kingpin P as shown in FIGURE 9. Thus, when collar 55 is depressed, jaws 66 are prevented from moving toward each other to closed position and may only be moved to closed position when force transmitting member 54 is in its upper normal position.

From the foregoing, hitch 10 has been illustrated which is mounted on a pair of legs arranged in an inverted V-shape. The legs are hydraulically actuated to move a supporting plate structure in a vertical direction between erect and collapsed position of hitch 10. Supporting plate structure 12 is adapted to automatically lock the kingpin of a trailer or the like without any manual operation being required and the kingpin of a trailer may be properly centered even if the trailer is not accurately positioned with respect to hitch 10. A kingpin locator or force transmitting member 54 minimizes bending stresses in kingpin P and further aids in the proper centering and seating of the kingpin.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A hitch adapted to be mounted on a railway car for engaging and securing the kingpin of a trailer or the like, said hitch comprising a supporting plate structure having an upper support plate with a generally central opening adapted to receive the kingpin, said support plate having a generally frusto-conical surface defining the central opening and forming a guide surface for centering the kingpin over the central opening for latching, a sleeve mounted within said central opening in vertical alignment therewith to receive the kingpin, means biasing the sleeve upwardly with the upper surface thereof generally adjacent the upper surface of the upper support plate whereby upon contact with a kingpin said sleeve is depressed against the bias of said biasing means until said kingpin is properly centered with respect to the central opening and the sleeve, said sleeve then returning to its original position about the kingpin under the bias of said biasing means with the upper surface of the sleeve generally adjacent the upper surface of the support plate whereby forces are transmitted between the kingpin and the sleeve, and means to latch the kingpin when properly seated within the sleeve.

2. A hitch as set forth in claim 1 wherein said means to latch the kingpin comprises a pair of oppositely facing jaws mounted beneath the upper support plate for sliding movement, and means to slide the jaws toward and away from each other in a generally horizontal direction.

3. A hitch as set forth in claim 2 wherein said means to slide the jaws toward and away from each other comprises a double acting hydraulic fluid cylinder having a reciprocable member extending from each end thereof, and linkage connecting each reciprocable member to a jaw for actuating the associated jaw.

4. A hitch as set forth in claim 1 wherein said sleeve has a pair of integral oppositely facing legs extending downwardly below the sleeve on opposite sides thereof, said means biasing the sleeve to an upper position being mounted beneath each leg to bias the legs and sleeve to upper position, said means to latch the kingpin comprising a pair of oppositely facing jaws arranged at right angles to said legs with respect to said sleeve and mounted below the lower surface of the sleeve when the sleeve is in its upper normal position, said sleeve when depressed being in the path of travel of said jaws toward each other to prevent latching of the kingpin when the kingpin is not centered.

5. A collapsible hitch adapted to be mounted on a railway car for engaging and securing the kingpin of a trailer or the like, said hitch comprising a supporting plate structure, a pair of extensible legs arranged in an inverted V-shape in an erect position of the hitch and having their upper ends pivotally connected to said supporting plate structure, each leg having separate fluid pressure means for extending and retracting the associated leg to raise and lower the supporting plate structure in a vertical direction between collapsed and erect positions, said supporting plate structure having an upper support plate with a generally central opening adapted to receive the kingpin, said support plate having a generally frusto-conical surface defining the central opening and forming a guide surface for centering the kingpin over the central opening for latching, a pair of oppositely facing jaws beneath the support plate mounted for sliding movement toward and away from each other in a generally horizontal longitudinal movement, a double acting hydraulic fluid cylinder mounted on said support plate structure and having an actuating member extending from each end thereof, and linkage connecting each actuating member to an associated jaw for moving the jaws toward and away from each other upon actuation of the hydraulic fluid cylinder, the supporting plate structure being movable in a vertical direction to receive and seat a superjacent kingpin and said jaws being adapted for releasably locking the kingpin after the kingpin is seated within the supporting plate structure.

6. A collapsible hitch adapted to be mounted on a railway car for engaging and securing the kingpin of a trailer or the like, said hitch comprising a supporting plate structure adapted to be raised and lowered in a generally vertical direction, said supporting plate structure having an upper support plate with a generally central opening adapted to receive the kingpin, said support plate having a generally frusto-conical surface defining the central opening and forming a guide surface for centering the kingpin over the central opening for latching, a force transmitting member mounted within said central opening and having a central aperture in concentric relation to said central opening, means biasing the force transmitting member to an upper normal position with the upper surface thereof generally adjacent the upper surface of the upper support plate, said force transmitting member having an annular upper rim of a frusto-conical surface forming a continuation of said frusto-conical surface of the support plate when the force transmitting member is fully depressed by the kingpin whereby upon contact with an uncentered kingpin said sleeve is depressed against the bias of said biasing means and said kingpin rides along the inclined frusto-conical surfaces until properly centered with respect to the force transmitting member, said force transmitting member then returning about the kingpin to its upper normal position under the bias of the biasing means, and means to latch the kingpin when properly seated within the central aperture of the force transmitting member whereby impact forces are transmitted between the kingpin and the force transmitting member.

7. A collapsible hitch as set forth in claim 6 wherein said force transmitting member comprises a sleeve and a pair of integral oppositely facing legs extending downwardly below the sleeve on opposite sides thereof, said means to latch the kingpin comprising a pair of oppositely facing jaws arranged at right angles to said legs with respect to said sleeve and mounted below the lower surface of the sleeve when the force transmitting member is in its upper normal position, and means to slide the jaws in a generally horizontal movement toward and away from each other for releasably latching the kingpin, said sleeve when depressed being in the path of travel of said jaws toward each other to prevent latching of the kingpin when the kingpin is not centered.

8. A collapsible hitch as set forth in claim 6 wherein said hitch comprises a pair of extensible legs pivotally mounted to said supporting plate structure and arranged in an inverted V-shape in an erect position of the hitch, each leg including separate fluid pressure means for extending and retracting the respective leg thereby to raise and lower the hitch in a generally vertical direction between collapsed and erect positions.

9. A collapsible hitch adapted to be mounted on a railway car for engaging and securing the kingpin of a trailer or the like, said hitch comprising a supporting plate structure adapted to be raised and lowered in a generally vertical direction, said supporting plate structure having an upper support plate with a generally central opening adapted to receive the kingpin, said support plate having a generally frusto-conical surface defining the central opening and forming a guide surface for centering the kingpin over the central opening for latching, a force transmitting member mounted within the central opening and including a sleeve for receiving the kingpin, said sleeve in its normal rest position having an upper surface generally in the same horizontal plane as the upper surface of the upper support plate, means permitting said force transmitting member to be depressed when contacted by an uncentered kingpin, means to return the force transmitting member to its normal rest position when the kingpin is properly centered with respect to said sleeve, said sleeve having an annular upper rim of a frusto-conical surface forming a continuation of the frusto-conical surface of the support plate when the force transmitting member is fully depressed thereby providing a smooth inclined surface for guiding the kingpin to centered position with respect to the sleeve, a pair of oppositely facing jaws beneath the support plate mounted for sliding movement toward and away from each other in a generally horizontal longitudinal movement, a double acting hydraulic fluid cylinder mounted on said support plate structure and having an actuating member extending from each end thereof, and linkage connecting each actuating member to an associated jaw for moving the jaws toward and away from each other upon actuation of the hydraulic fluid cylinder.

References Cited
UNITED STATES PATENTS

| | | | |
|---|---|---|---|
| 657,458 | 9/1900 | Schulz | 91—217 X |
| 1,532,029 | 3/1925 | Bobbitt | 92—69 X |
| 2,489,864 | 11/1949 | Cravener | 287—20.5 X |
| 2,647,789 | 8/1953 | Chayne | 292—144 X |
| 2,821,264 | 1/1958 | Ulinski | 92—117 X |
| 3,143,083 | 8/1964 | Gutridge et al. | 248—119 X |
| 3,189,307 | 6/1965 | Peterson | 248—119 |

ROY D. FRAZIER, *Primary Examiner.*

R. P. SEITTER, *Assistant Examiner.*